United States Patent [19]
White

[11] Patent Number: 5,871,232
[45] Date of Patent: Feb. 16, 1999

[54] OCCUPANT POSITION SENSING SYSTEM

[75] Inventor: Craig W. White, Grosse Pointe, Mich.

[73] Assignee: Automotive Systems, Laboratory, Inc., Farmington Hills, Mich.

[21] Appl. No.: 911,488

[22] Filed: Aug. 14, 1997

Related U.S. Application Data

[60] Provisional application No. 60/035,644 Jan. 17, 1997.
[51] Int. Cl.$^6$ .................................................. B60R 21/32
[52] U.S. Cl. ............................................................ 280/735
[58] Field of Search ............................................. 280/735

[56] References Cited

U.S. PATENT DOCUMENTS

| | | | |
|---|---|---|---|
| 3,672,699 | 6/1972 | De Windt | 280/735 |
| 3,740,567 | 6/1973 | Atkins | 307/10 SB |
| 3,767,002 | 10/1973 | Gillund | 280/735 |
| 3,898,472 | 8/1975 | Long | 307/10 SB |
| 4,300,116 | 11/1981 | Stahovec | 340/32 |
| 4,625,329 | 11/1986 | Ishikawa et al. | 382/1 |
| 4,796,013 | 1/1989 | Yasuda et al. | 340/562 |
| 4,831,279 | 5/1989 | Ingraham | 307/116 |
| 4,980,519 | 12/1990 | Mathews | 178/19 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,161,820 | 11/1992 | Vollmer | 280/730 |
| 5,205,582 | 4/1993 | Shiga et al. | 280/735 |
| 5,214,388 | 5/1993 | Vranish et al. | 324/683 |
| 5,232,243 | 8/1993 | Blackburn et al. | 280/732 |
| 5,247,261 | 9/1993 | Gershenfeld | 324/716 |
| 5,330,226 | 7/1994 | Gentry et al. | 280/735 |
| 5,366,241 | 11/1994 | Kithil | 280/735 |
| 5,398,185 | 3/1995 | Omura | 364/424.05 |
| 5,404,128 | 4/1995 | Ogino et al. | 340/425.5 |
| 5,411,289 | 5/1995 | Smith et al. | 280/735 |
| 5,413,378 | 5/1995 | Steffens, Jr. et al. | 280/735 |
| 5,439,249 | 8/1995 | Steffens, Jr. et al. | 280/735 |
| 5,446,661 | 8/1995 | Gioutsos et al. | 364/424.05 |
| 5,454,591 | 10/1995 | Mazur et al. | 280/735 |
| 5,474,327 | 12/1995 | Schousek | 280/735 |
| 5,482,314 | 1/1996 | Corrado et al. | 280/735 |
| 5,490,069 | 2/1996 | Gioutsos et al. | 364/424.05 |
| 5,494,311 | 2/1996 | Blackburn et al. | 280/735 |
| 5,515,933 | 5/1996 | Meyer et al. | 180/273 |
| 5,525,843 | 6/1996 | Howing | 307/9.1 |
| 5,528,698 | 6/1996 | Kamei et al. | 382/100 |
| 5,531,472 | 7/1996 | Semchena et al. | 280/735 |
| 5,549,323 | 8/1996 | Davis | 280/728.3 |

(List continued on next page.)

OTHER PUBLICATIONS

Reference Data for Engineers:Radio, Electronics, Computer, and Communications, 7th Edition, A. Fong, R. Coakley, J. Dupre, M. Fischer, R. Pratt, D. Rytting pp. 12–1 –12–13.

Standard Handbook for Electrical Engineers, Twelfth Edition, D. Fink, H. Beaty pp. 3–56 –3–65.

IBM Systems Journal, vol 35. NOS 3&4, 1996 –Field mice: Extracting hand geometry from electric field measurements, J.R. Smith pp. 587–608.

SAI Technical Paper Series, Occupant Sensing Utilizing Perturbation of ELectric Fields, K. Jinno, M. Ofuji, T. Saito, S. Sekido –International Congress & Exposition, Feb. 24–27, 1997, pp. 117–129.

*Primary Examiner*—Kenneth R. Rice
*Attorney, Agent, or Firm*—Lyon, P.C.

[57] ABSTRACT

An occupant position sensing system (10) incorporates first (12) and second (42) position sensors, wherein the first position sensor (12) senses the distance to the surface of an object and the second position sensor (42) senses the electric-field-influencing properties of the object for purposes of controlling the activation of a safety restraint system (38). In an exemplary system, the first position sensor (12) incorporates either an infrared beam or an ultrasonic beam as the sensing element, and the second position sensor senses the capacitance of a plurality of electrodes (46) for either disabling an air bag inflator (38) if the combination of the first and second position measurements of an occupant (24) is within a threshold, or for controlling a controllable air bag inflator (38).

32 Claims, 3 Drawing Sheets

U.S. PATENT DOCUMENTS

| | | | |
|---|---|---|---|
| 5,570,903 | 11/1996 | Meister et al. | 280/735 |
| 5,573,269 | 11/1996 | Gentry et al. | 280/735 |
| 5,602,734 | 2/1997 | Kithil | 364/424.055 |
| 5,612,876 | 3/1997 | Zeidler et al. | 364/424.055 |
| 5,618,056 | 4/1997 | Schoos et al. | 280/735 |
| 5,624,132 | 4/1997 | Blackburn et al. | 280/735 |
| 5,626,359 | 5/1997 | Steffens, Jr. et al. | 280/735 |
| 5,636,864 | 6/1997 | Hori | 280/735 |
| 5,653,462 | 8/1997 | Breed et al. | 280/735 |
| 5,702,123 | 12/1997 | Takahashi et al. | 280/735 |

OCCUPANT POSITION SENSING SYSTEM

The instant application claims benefit of prior U.S. Provisional application Ser. No. 60/035,644, filed on Jan. 17, 1997.

TECHNICAL ART

The instant invention generally relates to occupant position sensing systems for controlling the activation of vehicular safety restraint systems and more particularly for determining the presence and position of an occupant for purposes of influencing the decision of whether or not to deploy a safety restraint system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated danger-zone of the inflator. Recent NHTSA data suggests that severe injuries due to close proximity with the inflator can be reduced or eliminated if the air bag is disabled when the occupant is closer than approximately 4 to 8 inches from the inflator door. Such a system for disabling the air bag inflator requires an occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

The prior art teaches the use of sensors incorporated into the seat to detect the presence, weight, or seating position of the occupant. U.S. Pat. Nos. 3,672,699, 3,767,002, 5,161, 820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. No. 5,074,583 teaches a plurality of sensors incorporated into the seat to detect occupant weight and seating position for purposes of controlling an air bag system. U.S. Pat. Nos. 5,232,243, 5,494, 311, and 5,624,132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach the combination of ultrasonic sensor sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacity responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes.

In addition to methods taught by the above referenced U.S. Pat. Nos., the prior art also teaches various means of measuring capacitance, as for example given in *the Standard Handbook for Electrical Engineers* $12^{th}$ edition, D. G. Fink and H. W. Beaty editors, McGraw Hill, 1987, pp. 3-57 through 3-65 or in Reference Data for Engineers: Radio, Electronics, Computer, and Communications $7^{th}$ edition, E. C. Jordon editor in chief, Howard W. Sams, 1985, pp. 12-3 through 12—12, both included herein by reference.

The technical paper "Field mice: Extracting hand geometry from electric field measurements" by J. R. Smith, published in IBM Systems Journal, Vol. 35, Nos. 3 & 4, 1996, pp. 587–608, incorporated herein by reference, describes the concept of Electric Field Sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the shunt mode, a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the transmit mode, the transmit electrode is put in contact with the user's body, which then becomes a transmitter relative to a receiver, either by direct electrical connection or via capacitive coupling.

In one embodiment, a plurality of capacitive sensors are used to sense distances to the occupant, which in combination with the known locations of the fixed sensor elements are triangulated to locate the position of the occupant. One problem with such capacitive sensor arrangements is that they make use of the dielectric constant of known stability to detect the distance between a sensor and the occupant. Furthermore, the occupant position measurement tends to be associated with the center of mass of the sensed object. However, the sensor can be confused by large metal devices or arms/limbs in close proximity. Therefore, while these sensors may perform satisfactorily as an automatic "on/off" switch to either disable the air bag inflator based upon occupant position, or enable the air bag inflator to be fired responsive to the activation signal from the vehicle crash sensor, the present embodiments of capacitive occupant position sensors may not be sufficiently accurate and robust to provide for controllable inflation based upon occupant position.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the danger-zone proximate the inflator door, but are subject to several disadvantages. In particular, infrared based systems usually incorporate a beam much narrower than the volume of the danger-zone such that multiple beams may be required to reliably sense an object anywhere inside the danger-zone. The incorporation of multiple beams results in extra cost, complexity, and potentially slowed response. Furthermore, both infrared beam and ultrasonic base sensors would require a significant amount of hardware proximate the inflator door if the danger-zone proximate the inflator is to be monitored.

The main disadvantage of many occupant detection systems is that they do not gather the most relevant information to determine if the occupant is in a danger-zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information.

SUMMARY OF THE INVENTION

The instant invention overcomes the above-noted problems by providing an occupant position sensing system which combines a first position sensor which measures a first distance to the surface of an object with a second position sensor which is responsive to the electric-field influencing properties of the object and which measures a second distance to the object. The first and second distances are used in combination to control the activation of a safety restraint system. More particularly, for a single stage inflator having only one firing circuit, the instant invention can be used to disable the inflator if an occupant is sensed to be too close to the inflator. Moreover, for a multiple stage inflator having a plurality of firing circuits, the instant invention can provide a measure of occupant position for purposes of controlling the firing times of the various inflator stages, thereby controlling the time of initial inflator activation, the effective rate of air bag inflation, and the capacity of the air bag inflator.

The first position sensor, for example, could comprise an ultrasonic or electromagnetic ranging sensor which measures the first distance to the object from time required for the associated ultrasonic or electromagnetic wave to travel round trip from the sensor to the object being sensed, wherein the particular associated frequencies of wave oscillation are not considered limiting. The first position sensor could alternatively comprise a sensor which incorporates one or more beams of electromagnetic radiation, for example infrared (IR) radiation, to measure the first distance from the sensor to a point of reflection on the surface of the object using triangulation of two or more beam paths.

The second position sensor, for example, could comprise an electric field sensor, whereby the dielectric and conductive properties of the sensed object influences the electric field in proximity to one electrode, or between a plurality of electrodes, which effect is used to measure the second distance to the object. The second position sensor, could alternatively comprise a capacitive sensor, whereby the dielectric and conductive properties of the sensed object influences the capacitance of one or more electrodes, whereby the capacitance or effect therefrom is used to measure the second distance to the object.

Accordingly, one object of the instant invention is to provide an improved occupant position sensing system, which when incorporated into an occupant restraint system reduces the risk of injury to occupants by the air bag inflator.

A further object of the instant invention is to provide an improved occupant position sensing system, which more accurately determines if an occupant is positioned within the danger-zone of the air bag inflator.

A yet further object of the instant invention is to provide an improved occupant position sensing system, which more accurately delineates the danger-zone proximate the air bag inflator.

A yet further object of the instant invention is to provide an improved occupant position sensing system, which warns occupants when they are at risk of injury from the air bag inflator.

A yet further object of the instant invention is to provide an improved occupant position sensing system, with improved detection of rear facing infant seats.

A yet further object of the instant invention is to provide an improved occupant position sensing system, with improved differentiation between animate and inanimate objects.

A yet further object of the instant invention is to provide an improved occupant position sensing system, with improved measurement of occupant position so as to enable improved occupant position dependent control of inflation.

A yet further object of the instant invention is to provide an improved occupant position sensing system, which reduces the likelihood of false position measurements due to occupant extremities or objects proximate the air bag inflator.

In accordance with these objectives, one feature of the instant invention is the incorporation of a first position sensor which measures the distance to the surface of an object together with a second position sensor which measures the distance to the object based upon the electric-field-influencing properties of the object.

Another feature of the instant invention is the incorporation of a controller operatively coupled to first and second position sensors for activating a safety restraint system responsive to measurements from the first and second position sensors.

Yet another feature of the instant invention is the incorporation of a control characteristic in the controller for controlling the activation of the safety restraint system responsive to measurements from the first and second position sensors.

Yet another feature of the instant invention is the incorporation of one or more electromagnetic beams in the first position sensor, preferably of infrared frequency, for measuring the distance to a point of reflection on the object by triangulation relative to known positions of points of transmission and reception of the beam within the sensor.

Yet another feature of the instant invention is the incorporation of one or more ultrasonic beams in the first position sensor, for measuring the distance to a point of reflection on the object by ranging.

Yet another feature of the instant invention is the incorporation of an electric field sensor having a plurality of electrodes as the second position sensor, for measuring the distance to the object responsive to the electric-field-influencing properties of the object, which properties include the permittivity, conductivity, and position of the object.

Yet another feature of the instant invention is the incorporation of a capacitance sensor having a plurality of electrodes as the second position sensor, for measuring the distance to the object responsive to the electric-field-influencing properties of the object which affect the capacitance amongst the electrodes.

Yet another feature of the instant invention is the means to inhibit activation of the associated safety restraint system if an occupant is positioned within a threshold defined within the space of the first and second measurements of distance.

Yet another feature of the instant invention is the activation of a warning device if an occupant is positioned within a threshold defined within the space of the first and second measurements of distance.

The specific features of the instant invention provide a number of associated advantages. One advantage of the instant invention with respect to the prior art is an improved determination of whether an occupant is positioned so as to be at risk of injury from the deployment of an air bag inflator so that the air bag inflator may be accordingly controlled so as to reduce the risk of such injuries.

Another advantage of the instant invention is an improved differentiation of animate and inanimate objects for purposes of either deactivating the air bag inflator in the case of an inanimate object, or for preventing the deactivation of the air bag inflator in the case of an occupant either holding an object or placing an extremity, proximate the first position sensor.

Yet another advantage of the instant invention is an improved basis for warning if either an occupant is positioned in the danger-zone proximate the inflator, or if the inflator has been deactivated because an occupant is positioned therein.

Yet another advantage of the instant invention is improved protection for infants in rear facing infant seats for whom the air bag inflator is disabled.

Yet another advantage of the instant invention is an improved measurement of occupant position so that a controllable inflator may be better controlled responsive to occupant position so as to reduce the risk of injury to an occupant in a vehicle crash.

These and other objects, features, and advantages of the instant invention will be more fully understood after reading the following detailed description of the preferred embodiment with reference to the accompanying drawings. While this description will illustrate the application of the instant invention in a frontal air bag restraint system, it will be understood by one with ordinary skill in the art that the instant invention can also be applied to other types of restraint systems, such as for protection from side-impact, rear-impact, or roll-over collisions, such as with air bags, seat belt pretensioners, or deployable knee bolsters.

DETAILED DESCRIPTION OF THE PREFERRED EMBODIMENT(S)

Figure 1:
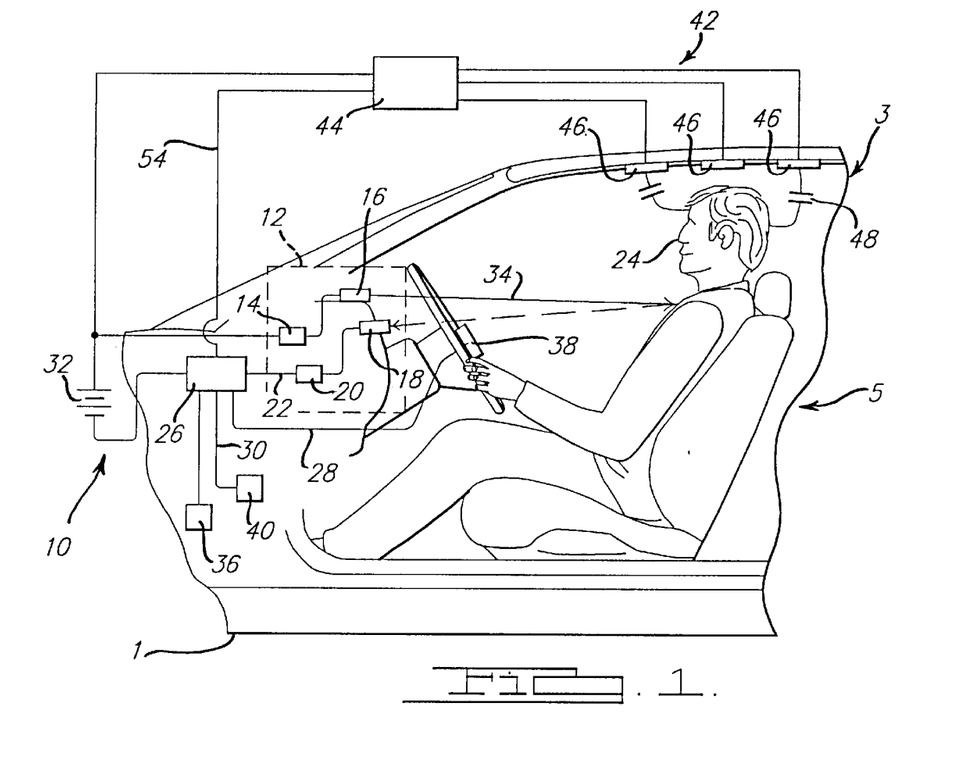
FIG. 1 is a side view of a vehicle illustrating an embodiment of the instant invention which incorporates a infrared beam position sensor.

Referring to FIG. 1, a vehicle 1 is equipped with an occupant position sensing system 10 for controlling the activation of an air bag inflator safety restraint system 38 for purposes of protecting an occupant 24 in a crash. A first position sensor 12, an active infrared position sensor, comprises a modulator 14 connected to an optical transmitter 16 powered by a source of power 32, and an optical receiver 18 connected to a synchronous demodulator 20 in accordance with U.S. Pat. No. 5,490,069 which is incorporated herein by reference. The demodulator 20 generates an output 22 indicative of the distance between an occupant 24 and a potential impact point within the vehicle responsive to the detection of the reflection of an infrared beam generated by the optical transmitter 16 from the surface of an occupant 24. The output 22 is supplied to a signal processor/discriminator unit 26 for storage in a memory 36. The active infrared position sensor 12 operates in accordance with known principles, methods, and structures of active infrared beam position sensors understood by one of ordinary skill in the art. A second position sensor 42, responsive to the electric-field-influencing properties of objects to be sensed, comprises one or more electrodes 46 which are capacitively coupled 48 to the occupant 24. A electric field sensor module 44 is powered by a source of power 32 and is operatively connected to the electrodes 46 to create an electric field proximate and between the electrodes 46. The electric field sensor module 44 also senses the influence of the occupant 24 upon the electric field and generates an output 54 indicative of the position of the occupant 24. The second position sensor 42 operates in accordance with known principles, methods, and structures of electric field or capacitive sensors as understood by one of ordinary skill in the art. The output 54 from the electric field sensor module 44 is connected to the control processor/discriminator unit 26 which generates a control signal 28 responsive to the outputs from the first 12 and second 42 position sensors for controlling the safety restraint system 38, and which generates an output 30 for activating a warming device such as a light or buzzer 40.

Figure 2:
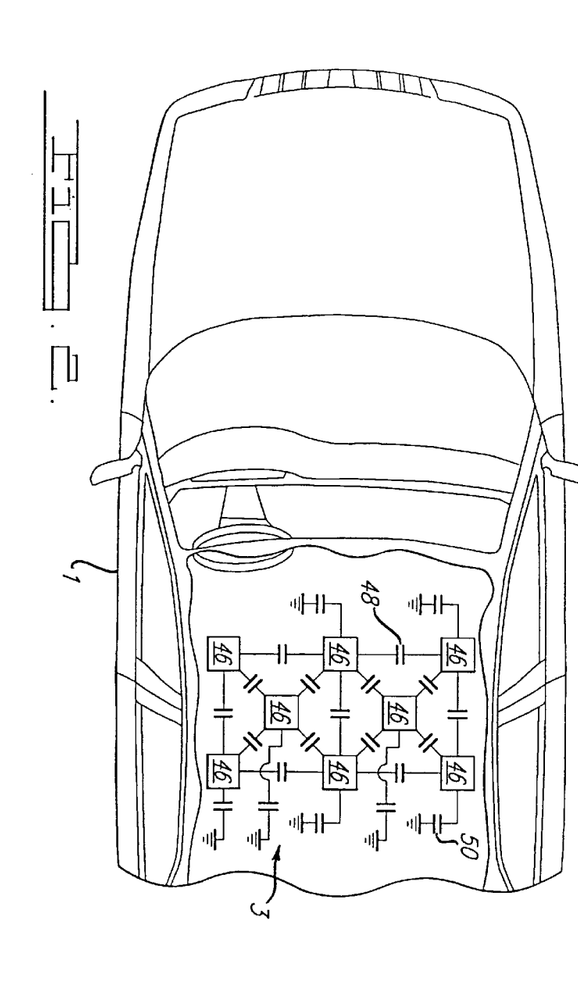
FIG. 2 is a top view of a vehicle illustrating an arrangement of electrodes for the capacitive sensing subsystem.

FIG. 2 illustrates in a top view of the vehicle 1 an array of electrodes 46 which are incorporated into the headliner 3 of the vehicle passenger compartment for an exemplary embodiment of the second position sensor 42. Each of the electrodes is connected to the electric field sensor module 44 and experience interelectrode capacitance 48 and capacitance 50 relative to system ground.

Figure 3:
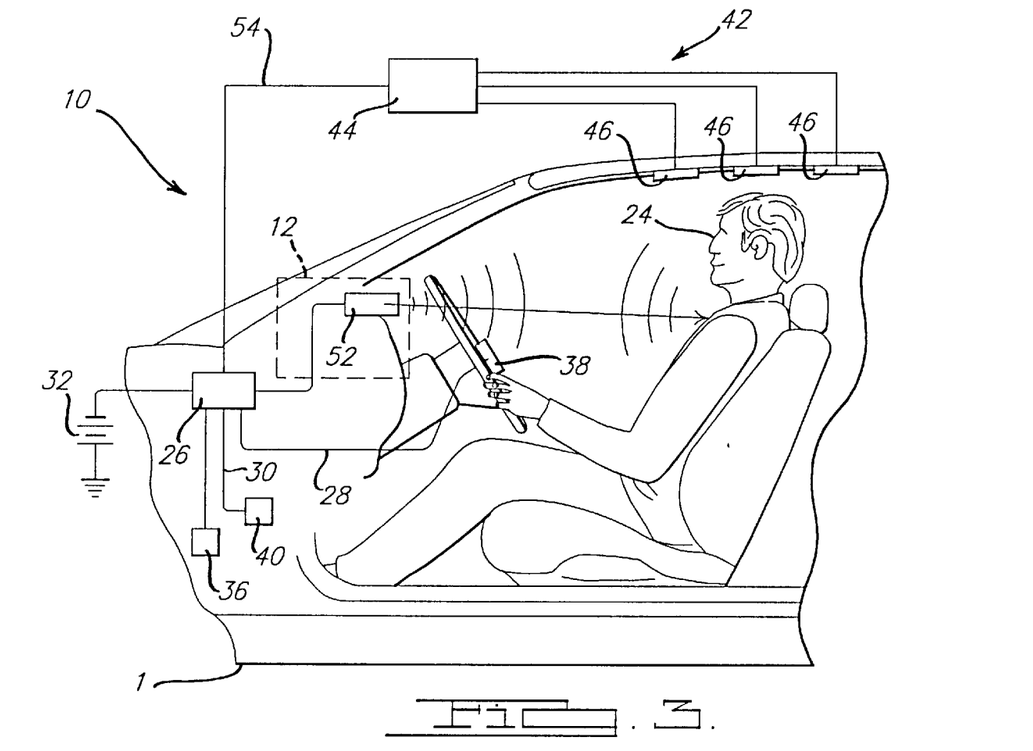
FIG. 3 is a side view of a vehicle illustrating an embodiment of the instant invention which incorporates an ultrasonic position sensor.

Referring to FIG. 3, an ultrasonic position sensor 52 is substituted for the active infrared position sensor of FIG. 1 as the first position sensor 12, whereby the operation of the system 10 in conjunction with the second position sensor 42 is otherwise the same as described above in conjunction with the active infrared position sensor of FIG. 1.

Figure 4:
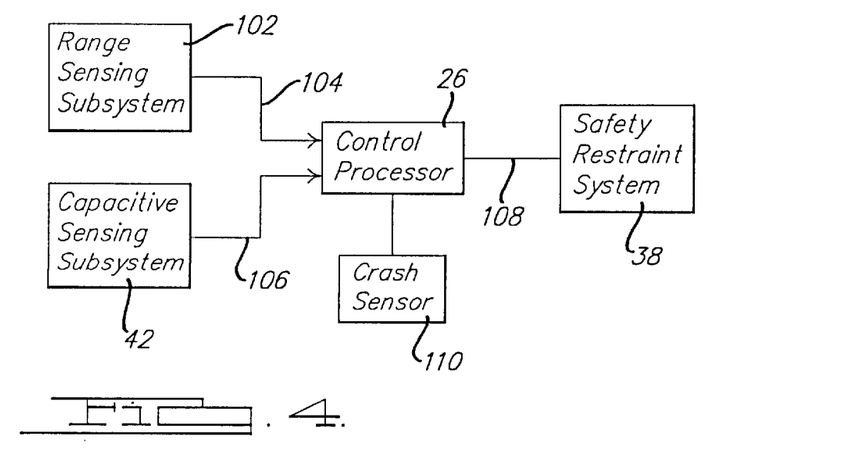
FIG. 4 is a block diagram of the instant invention.

FIG. 4 illustrates the general principle of instant invention. A range sensing subsystem 102 as a first position sensor senses the distance to the surface of an object and outputs the measurement thereof 104 to a control processor 26. A capacitive sensing subsystem 42 as a second position sensor senses the distance to the object responsive to the electric-field-influencing properties of the object and outputs the measurement thereof 106 to the control processor 26. The electric-field-influencing properties of the object include the permittivity, conductivity, size, weight and position. To some extent, the capacitive subsystem 42 can distinguish an animate from an inanimate object. The control processor 26 determines from the first 104 and second 106 distances whether or not to activate the safety restraint system 38. If the distances 104 and 106 are such that an occupant would likely be harmed by the activation of the safety restraint system 38, then such activation is inhibited. Otherwise, if a crash sensor 108 detects a crash of sufficient severity that the safety restraint system should be activated, then the control processor 26 generates an activation signal 108 to activate the safety restraint system 26. One of ordinary skill in the art will appreciate that the crash sensor 108 can be incorporated into the control processor 26 so as to constitute a single unit.

Figure 5:
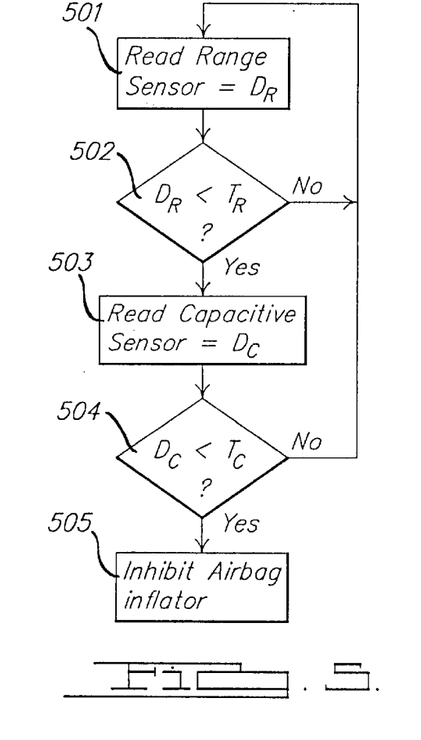
FIG. 5 is a flow chart of one embodiment of the instant invention.

Referring to FIG. 5, the control processor 26 reads a range sensor to measure the distance $D_R$ to the surface of the object in step 501. If in step 502 this distance is greater than a specified threshold $T_R$, indicative that the occupant would not be in danger of injury by the safety restraint system 38, then step 501 is repeated. Otherwise, the control processor in step 503 reads the capacitive sensor to measure the distance $D_C$ from the electric-field-influencing properties of the object. If in step 504 this distance is less that a threshold $T_C$, indicative that the occupant would not be in danger of injury by the safety restraint system 38, then step 501 is repeated. Otherwise, in step 505, the control processor inhibits the activation of the safety restraint system 38.

Figure 6:
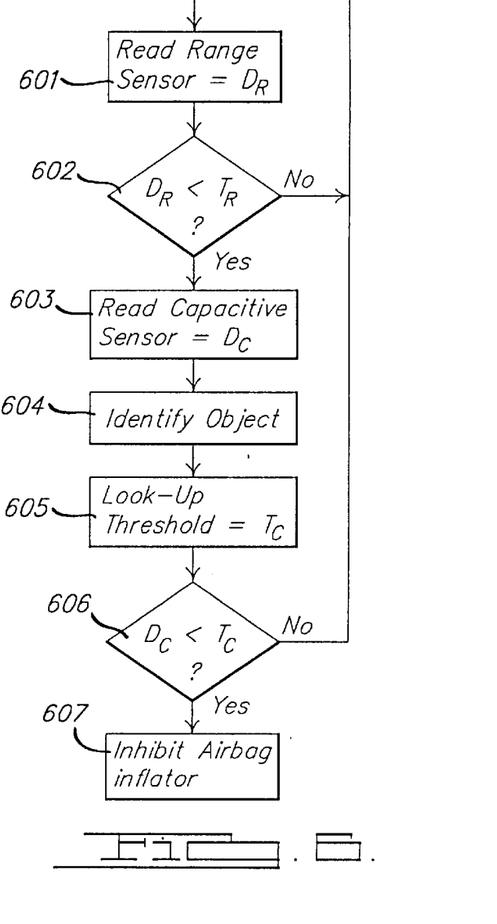
FIG. 6 is a flow chart of another embodiment of the instant invention.

Referring to FIG. 6, which illustrates another aspect of the instant invention, the control processor 26 reads a range sensor to measure the distance $D_R$ to the surface of the object in step 601. If in step 602 this distance is greater than a specified threshold $T_R$, indicative that the occupant would not be in danger of injury by the safety restraint system 38, then step 601 is repeated. Otherwise, the control processor in step 603 reads the capacitive sensor to measure the distance $D_C$ from the electric-field-influencing properties of the object. In step 604, the control processor then identifies the type of object from a combination of the two measurements $D_R$ and $D_C$ using a characteristic stored in memory 36. Given this control characteristic and the measurements $D_R$ and $D_C$, the control processor looks up the threshold value $T_C$ from memory in step 605. If in step 606 the distance $D_C$ is greater that a threshold $T_C$, indicative that the occupant would not be in danger of injury by the safety restraint system 38, then step 601 is repeated. Otherwise, in step 607, the control processor inhibits the activation of the safety restraint system 38.

Figure 7:
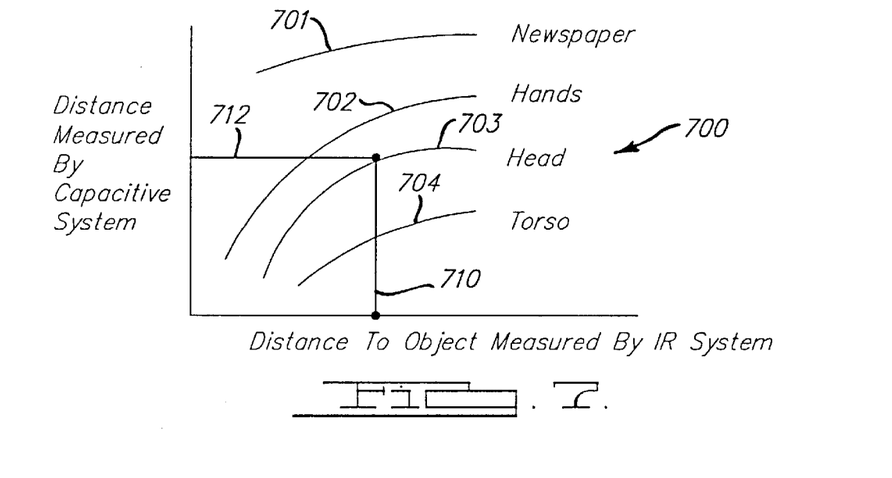
FIG. 7 is an illustration of the sensing characteristics associated with the instant invention.

In accordance with the instant invention, the capacitive sensing subsystem 42 can be calibrated with a family of curves based on a predetermined material as illustrated in FIG. 7. Then, based on the detected actual distance $D_R$, the capacitive distance reading $D_C$, and a look up to a family of object curves for the capacitive sensor, a determination can be accurately made regarding the type of object within the critical deployment area. For example, if a newspaper were placed a distance of 6 inches from an inflator or other impact point within the interior of a vehicle, range sensing subsystem 102 alone would indicate a non-deployment situation. However, capacitive sensing subsystem 42 would fail to detect the presence of a "human" within the critical range, and would therefore prevent the activation of the safety restraint from being inhibited.

As a result, the dual sensing system of the instant invention is able to discriminate between different objects, such as hands, a head, newspapers, etc., positioned within the critical range. Such information about actual distance as well as type of object allows an intelligent deployment system to make a decision regarding airbag timing or deployment. The combination of the two sensing subsystems results in a more confident reading regarding distance and nature of object for use in the vehicle safety system.

One of ordinary skill in the art will appreciate that the measurement of a physical quantity such as distance or capacitance in the context of the instant invention does not necessarily require that the actual distance in units of length, or capacitance in units of farads, be measured in order to practice the instant invention. Instead, the actual sensed quantity could be of different physical units, such as frequency, voltage, or current, whereby the sensed quantity varies in response to actual variations in distance of the object to be sensed.

One of ordinary skill in the art will further appreciate that distances measured by a position sensor may be transformed to corresponding distances relative to any point of reference which position is known relative to the associated position sensor.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. An object position sensing system for controlling the activation of a safety restraint system, comprising:
   a. a first position sensor for measuring the distance from a point of reference to the surface of the object;
   b. a second position sensor responsive to the electric-field-influencing properties of the object for generating a measure of distance from a point of reference to the object;
   c. a controller operatively coupled to said first and second position sensors for controlling the activation of the safety restraint system responsive to said measurement and said measure of distance.

2. The object position sensing system for controlling the activation of a safety restraint system as recited in claim 1, wherein said first position sensor incorporates at least one infrared beam as the sensing element.

3. The object position sensing system for controlling the activation of a safety restraint system as recited in claim 1, wherein said first position sensor incorporates at least one ultrasonic beam as the sensing element.

4. The object position sensing system for controlling the activation of a safety restraint system as recited in claim 1, wherein said second position sensor incorporates a plurality of electrodes for sensing the effect of the object on the electric field therebetween.

5. The object position sensing system for controlling the activation of a safety restraint system as recited in claim 4, wherein said second position sensor senses the effect of the object on the electrical capacitance of a plurality of electrodes.

6. The object position sensing system for controlling the activation of a safety restraint system as recited in claim 2, wherein said second position sensor incorporates a plurality of electrodes for sensing the effect of the object on the electric field therebetween.

7. The object position sensing system for controlling the activation of a safety restraint system as recited in claim 6, wherein said second position sensor senses the effect of the object on the electrical capacitance of a plurality of electrodes.

8. The object position sensing system for controlling the activation of a safety restraint system as recited in claim 1, wherein said controller inhibits the activation of the safety restraint system if the combination of said measurement and said measure of distance is within a threshold.

9. The object position sensing system for controlling the activation of a safety restraint system as recited in claim 2, wherein said controller inhibits the activation of the safety restraint system if the combination of said measurement and said measure of distance is within a threshold.

10. The object position sensing system for controlling the activation of a safety restraint system as recited in claim 3, wherein said controller inhibits the activation of the safety restraint system if the combination of said measurement and said measure of distance is within a threshold.

11. The object position sensing system for controlling the activation of a safety restraint system as recited in claim 4, wherein said controller inhibits the activation of the safety restraint system if the combination of said measurement and said measure of distance is within a threshold.

12. The object position sensing system for controlling the activation of a safety restraint system as recited in claim 5, wherein said controller inhibits the activation of the safety restraint system if the combination of said measurement and said measure of distance is within a threshold.

13. The object position sensing system for controlling the activation of a safety restraint system as recited in claim 6, wherein said controller inhibits the activation of the safety restraint system if the combination of said measurement and said measure of distance is within a threshold.

14. The object position sensing system for controlling the activation of a safety restraint system as recited in claim 7, wherein said controller inhibits the activation of the safety restraint system if the combination of said measurement and said measure of distance is within a threshold.

15. The object position sensing system for controlling the activation of a safety restraint system as recited in claim 1, further comprising a warning device operatively coupled to said controller so as to indicate when the combination of said measurement and said measure of distance is within a threshold.

16. The object position sensing system for controlling the activation of a safety restraint system as recited in claim 2, further comprising a warning device operatively coupled to said controller so as to indicate when the combination of said measurement and said measure of distance is within a threshold.

17. The object position sensing system for controlling the activation of a safety restraint system as recited in claim 3, further comprising a warning device operatively coupled to said controller so as to indicate when the combination of said measurement and said measure of distance is within a threshold.

18. The object position sensing system for controlling the activation of a safety restraint system as recited in claim 4, further comprising a warning device operatively coupled to said controller so as to indicate when the combination of said measurement and said measure of distance is within a threshold.

19. The object position sensing system for controlling the activation of a safety restraint system as recited in claim 5, further comprising a warning device operatively coupled to said controller so as to indicate when the combination of said measurement and said measure of distance is within a threshold .

20. The object position sensing system for controlling the activation of a safety restraint system as recited in claim 6, further comprising a warning device operatively coupled to said controller so as to indicate when the combination of said measurement and said measure of distance is within a threshold.

21. The object position sensing system for controlling the activation of a safety restraint system as recited in claim 7, further comprising a warning device operatively coupled to said controller so as to indicate when the combination of said measurement and said measure of distance is within a threshold.

22. A method of sensing the position of an object for controlling the activation of a safety restraint system comprising:
   a. measuring a distance from a point of reference to the surface of the object;
   b. generating a measure of distance from the point of reference to the object by sensing the effect of the object on a proximate electric field;
   c. controlling the activation of the safety restraint system responsive to said measurement and said measure of distance.

23. The method of sensing the position of an object for controlling the activation of a safety restraint system as recited in claim 22, wherein the activation of the safety restraint system is inhibited if the combination of said measurement and said measure of distance is within a threshold.

24. The method of sensing the position of an object for controlling the activation of a safety restraint system as recited in claim 22, wherein said measure of distance is generated by sensing the capacitance of a plurality of electrodes.

25. The method of sensing the position of an object for controlling the activation of a safety restraint system as recited in claim 23, wherein said measure of distance is generated by sensing the capacitance of a plurality of electrodes.

26. The method of sensing the position of an object for controlling the activation of a safety restraint system as recited in claim 22, wherein a warning device is activated if the combination of said measurement and said measure of distance is within a threshold.

27. The method of sensing the position of an object for controlling the activation of a safety restraint system as recited in claim 23, wherein a warning device is activated if the combination of said measurement and said measure of distance is within a threshold.

28. The method of sensing the position of an object for controlling the activation of a safety restraint system as recited in claim 24, wherein a warning device is activated if the combination of said measurement and said measure of distance is within a threshold.

29. The method of sensing the position of an object for controlling the activation of a safety restraint system as recited in claim 25, wherein a warning device is activated if the combination of said measurement and said measure of distance is within a threshold.

30. A method of sensing the position of an object for controlling the activation of a safety restraint system comprising:
   a. generating a first signal responsive to the distance from a point of reference to the surface of the object;
   b. generating a second signal responsive to the effect of the object on a proximate electric field;
   c. controlling the activation of the safety restraint system responsive to said first and second signals.

31. An object position sensing system for controlling the activation of a safety restraint system, comprising:
   a. a first sensor for generating a first signal responsive to the measurement of distance from a point of reference to the surface of the object;
   b. a second sensor for generating a second signal responsive to the influence of the object on an electric field;
   c. a controller operatively coupled to said first and second sensors for controlling the activation of the safety restraint system responsive to said first and second signals.

32. An object position sensing system for controlling the activation of a safety restraint system, comprising:
   a. a first means for measuring the distance from a point of reference to the surface of the object;
   b. a second means for sensing the influence of the object on an electric field;
   c. a controller operatively coupled to said first and second means for controlling the activation of the safety restraint system.

* * * * *